(12) United States Patent
Harting et al.

(10) Patent No.: US 11,952,225 B2
(45) Date of Patent: Apr. 9, 2024

(54) STACKING STORAGE ARRANGEMENT

(71) Applicant: Jungheinrich Aktiengesellschaft, Hamburg (DE)

(72) Inventors: Elmar Harting, Offenbach (DE); Jörg Cavelius, Bad Vilbel (DE); Michael Becker, Hainburg (DE)

(73) Assignee: JUNGHEINRICH AKTIENGESELLSCHAFT, Hamburg (DE)

( * ) Notice: Subject to any disclaimer, the term of this patent is extended or adjusted under 35 U.S.C. 154(b) by 432 days.

(21) Appl. No.: 16/999,182

(22) Filed: Aug. 21, 2020

(65) Prior Publication Data
US 2021/0053777 A1   Feb. 25, 2021

(30) Foreign Application Priority Data
Aug. 23, 2019  (EP) .................... 19193378

(51) Int. Cl.
*B65G 57/30* (2006.01)
*B65G 1/04* (2006.01)
*B65G 1/14* (2006.01)

(52) U.S. Cl.
CPC ......... *B65G 57/302* (2013.01); *B65G 1/0471* (2013.01); *B65G 1/14* (2013.01); *B65G 2201/025* (2013.01); *B65G 2203/042* (2013.01)

(58) Field of Classification Search
CPC ...... B65G 57/302; B65G 1/0471; B65G 1/14; B65G 2201/025; B65G 2203/042
See application file for complete search history.

(56) References Cited

U.S. PATENT DOCUMENTS

| | | | | |
|---|---|---|---|---|
| 2,839,802 | A * | 6/1958 | Bean | B22D 25/02 164/136 |
| 3,967,868 | A * | 7/1976 | Baker, Jr. | A47B 53/02 295/1 |
| 4,400,344 | A * | 8/1983 | Wachter | G21C 19/07 976/DIG. 248 |
| 5,048,702 | A * | 9/1991 | Maloney | B62B 3/006 211/194 |
| 6,663,148 | B2 * | 12/2003 | Bonora | H01L 21/67373 292/159 |
| 9,151,770 | B2 * | 10/2015 | Reuteler | G01N 35/1095 |
| 9,555,981 | B2 * | 1/2017 | Bürgel | B65G 59/067 |
| 10,240,408 | B2 * | 3/2019 | Finlay | G01R 33/072 |
| 10,336,540 | B2 * | 7/2019 | Gravelle | B65G 1/04 |
| 10,358,301 | B2 * | 7/2019 | Lykkegaard | B65G 57/303 |

(Continued)

FOREIGN PATENT DOCUMENTS

| | | |
|---|---|---|
| DE | 29521393 | 2/1997 |
| DE | 19849391 | 5/2000 |

(Continued)

OTHER PUBLICATIONS

Europe Search Report/Office Action conducted in counterpart Europe Appln. No. 19193378 (dated Feb. 21, 2020)

*Primary Examiner* — Lynn E Schwenning
(74) *Attorney, Agent, or Firm* — GREENBLUM & BERNSTEIN, P.L.C.

(57) ABSTRACT

A stacking storage arrangement that includes multiple container receiving spaces; a loading space located below the container receiving spaces; and a frame arrangement arranged between the container receiving spaces and the loading space.

22 Claims, 4 Drawing Sheets

(56) References Cited

U.S. PATENT DOCUMENTS

| | | | |
|---|---|---|---|
| 2005/0051505 A1* | 3/2005 | Lewis | B65G 1/06 |
| | | | 211/151 |
| 2009/0060700 A1* | 3/2009 | Grainger | B65D 19/38 |
| | | | 414/788.9 |
| 2009/0297324 A1* | 12/2009 | Jaeger | B65G 59/063 |
| | | | 414/801 |
| 2011/0036798 A1* | 2/2011 | Chen | A47B 47/0008 |
| | | | 211/188 |
| 2014/0308107 A1* | 10/2014 | Nickles | B65G 57/302 |
| | | | 29/418 |
| 2017/0217684 A1* | 8/2017 | Swoboda | B65G 59/063 |
| 2020/0039743 A1* | 2/2020 | Ambrosi | B65G 43/10 |

FOREIGN PATENT DOCUMENTS

| | | | | |
|---|---|---|---|---|
| DE | 102013009340 | * | 12/2014 | B65G 1/06 |
| EP | 1710179 | | 10/2006 | |
| JP | 59108618 | * | 6/1984 | B65G 57/30 |
| WO | 96/31420 | | 10/1996 | |
| WO | WO 2016/172793 | * | 11/2016 | B65G 1/04 |

* cited by examiner

STACKING STORAGE ARRANGEMENT

CROSS-REFERENCE TO RELATED APPLICATIONS

The present application claims priority under 35 U.S.C. § 119 of European Patent Application No. EP 19193378.7 filed Aug. 23, 2019, the disclosure of which is expressly incorporated by reference herein in its entirety.

BACKGROUND

1. Field of the Invention

The present invention relates to a stacking storage arrangement having multiple container receiving spaces and a loading region that is arranged below the container receiving spaces.

2. Discussion of Background Information

A stacking storage arrangement of this type is known from EP 1 710 179 B1, for example. In a stacking storage arrangement of this type, the containers can be stored with a relatively large density, that is, little space for access points is lost. The only access point that is necessary in order to place a container into storage in the stacking storage arrangement or to remove the container from the stacking storage arrangement is formed by the loading space.

To enable a loading vehicle to be moved in the loading space, it is necessary that the stack(s) of containers be held at a certain distance from the floor or another contact surface. For this purpose, holding devices in the form of catches are provided in the known case, which catches are fastened at the bottom of longitudinal beams which run the entire length of the stacking storage arrangement. Accordingly, each stack is held at this distance by the bottom container thereof. For this purpose, holding latches or analogous devices are used which, in the known case, are arranged below longitudinal beams. On the longitudinal beams, uprights that form a boundary of container receiving spaces can also be arranged. The holding latches automatically snap into place when a container with a stack of additional containers located thereon is lifted and lowered after passing the holding latches. For the removal of a container, the latches can be unlocked after the lifting of the stack.

The mechanical stability of a stacking storage arrangement of this type is poor.

SUMMARY

Embodiments of the invention are directed to achieving high mechanical stability with little effort.

In embodiments, a stacking storage arrangement of the type named at the outset includes a frame arrangement arranged between the container receiving spaces and the loading space.

The frame arrangement thus forms a "base surface" or base structure to which the bottommost container of each stack can be secured. The frame arrangement offers a higher stability than an arrangement that only comprises longitudinal beams, since in the frame arrangement, sections running longitudinally are connected to one another by sections running transversely. The frame arrangement as a whole can be leveled, that is, aligned horizontally. Due to the high stability, it is possible to minimize the number of supports with which the stacking storage arrangement is braced on the flooring or another contact surface.

Preferably, the frame arrangement comprises for each container receiving space an opening through which the container receiving space can be loaded. Each container receiving space thus has its own opening that can be embodied to be adequately stable and on which holding latches or the like can accordingly also be arranged, which holding latches then hold the bottommost container of the respective stack in place such that the loading space remains clear.

Preferably, the frame arrangement comprises multiple modules that are connected to one another, in particular on parallel side surfaces. It is thus possible to produce a stacking storage arrangement which has a relatively long length and also a relatively wide width. The frame arrangement does not need to be transported in one piece to the location in which the stacking storage arrangement is to be erected. Instead, individual modules can be transported to this location and can be connected to one another on site. The modules can preferably have a rectangular shape so that they have parallel side surfaces which can be easily connected to one another, for example, using threaded bolts or other detachable or non-detachable fasteners.

Preferably, at least one module comprises multiple openings. For example, a module having 2, 3, 4, or 5 openings can be provided. These openings are then preferably positioned consecutively in a row so that the width of the module can be kept relatively small, which facilitates the transport and the handling of a module of this type.

Preferably, at least one module is embodied as a cast part. A cast part can be produced cost-effectively, yet has a sufficient mechanical stability.

Preferably, on the top side of at least one module, an insertion aid is arranged in the region of at least one edge of the opening, which insertion aid in particular projects inwards into the opening and is preferably rounded. The opening can thus be kept relatively small, since the insertion aid prevents the container from becoming caught on the edge of the opening, especially during a downward movement, which is particularly advantageous in the case of a module made of cast iron. For example, the insertion aid can, with a rounded wall section, protrude slightly into the opening or can protrude inwards over an edge of the opening, so that the container, if it is not guided such that it is centered in an entirely precise manner, comes into contact with the insertion aid, but does not become caught there due to the rounded side. The insertion aid can be affixed to the module as a separate part or be connected to the module in one piece.

Preferably, the openings comprise corners in which holding latches are respectively arranged. As mentioned above, the holding latches are used to hold the respectively bottommost container of a stack. If these holding latches are arranged in the corners of the openings, then they also act on the corners of the containers. A container is normally the most stable in the corners. Accordingly, relatively tall stacks can be provided in the stacking storage arrangement without overloading the bottommost container. Furthermore, the arrangement of the holding latches in the corners has the advantage that the containers are held from all directions, that is, they are not only held in a first direction, but rather also in a second direction that runs transversely to the first direction.

Preferably, each holding latch is arranged on a bracket of a holding latch module, which bracket is mounted in the frame. This has the advantage that, in the event of a defect, the holding latch module can be replaced, which can be accomplished relatively easily. The holding latch module can then be repaired outside of the stacking storage arrangement if necessary. It is also possible to use different holding latch modules, and to then adapt these holding latch modules to the respectively intended load.

Here, it is preferred that the holding latch module is arranged in a notch in the frame arrangement. The holding latch module then reinforces the frame arrangement again. Due to the notch in the frame arrangement, no additional assembly space is necessary for the holding latch module. The notch can simply be a recess, or can extend through the frame arrangement.

Preferably, the holding latch can be pivoted about a pivot axis that forms an angle of less than 90°, preferably an angle of roughly 45°, with two adjacent sides of the opening. The pivot axis forms a triangle with two adjacent sides of the opening. The holding latches are thus not only arranged at the corners, they can also be pivoted obliquely inwards into the opening from the corners.

Preferably, the holding latches are embodied as two-armed levers having an inner arm and an outer arm, wherein a stop for the outer arm is provided. Thus, when the lever with the outer arm thereof bears against the stop, the pivot axis lies between the inner arm and the outer arm in a horizontal direction. In this manner, a relatively high stability of the holding latch can be achieved.

Preferably, a spring is provided which applies a force to the outer arm in the direction of the stop. It is thus ensured that the holding latch is always pivoted in a holding position if no other external forces are acting on the holding latch. This increases safety during the loading of the stacking storage system with containers.

Preferably, a sensing element of a sensor arrangement is arranged on each holding latch. The sensing element interacts with a receiver. The sensor arrangement can then determine whether or not the holding latch is located in a holding position. This increases safety during the loading of the stacking storage arrangement with a container and also during the removal of a container from the stacking storage arrangement. If it is determined during loading that the holding latch has not pivoted into its holding position, then the further lowering of the stack of containers can be interrupted and an error message can be outputted. The same applies for the removal of a container from the stacking storage arrangement. If the bottom container is lowered and it is determined with the aid of the sensor arrangement that the holding latches (or at least one holding latch) do not engage with the next container, for example because it has not been pivoted into the holding position, then the further lowering of the stack can be interrupted.

Here, it is preferred that the sensing element is embodied as a reflector. An optical sensor arrangement that directs a beam of light at the reflector can then be used. The reflected beam of light can be acquired by the sensor arrangement. If it is acquired, then this is an indication that the holding latch has pivoted into the holding position. If this is not the case, then the holding latch is in the wrong position.

Here, it is preferred that the sensing element is arranged on the bottom side of the inner arm. In this case, other parts of the sensor arrangement can be arranged below the stack of containers, for example even on movable elements such as the loading vehicle.

A stacking storage arrangement including multiple container receiving spaces; a loading space located below the container receiving spaces; and a frame arrangement arranged between the container receiving spaces and the loading space.

Other exemplary embodiments and advantages of the present invention may be ascertained by reviewing the present disclosure and the accompanying drawing.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Figure 1:
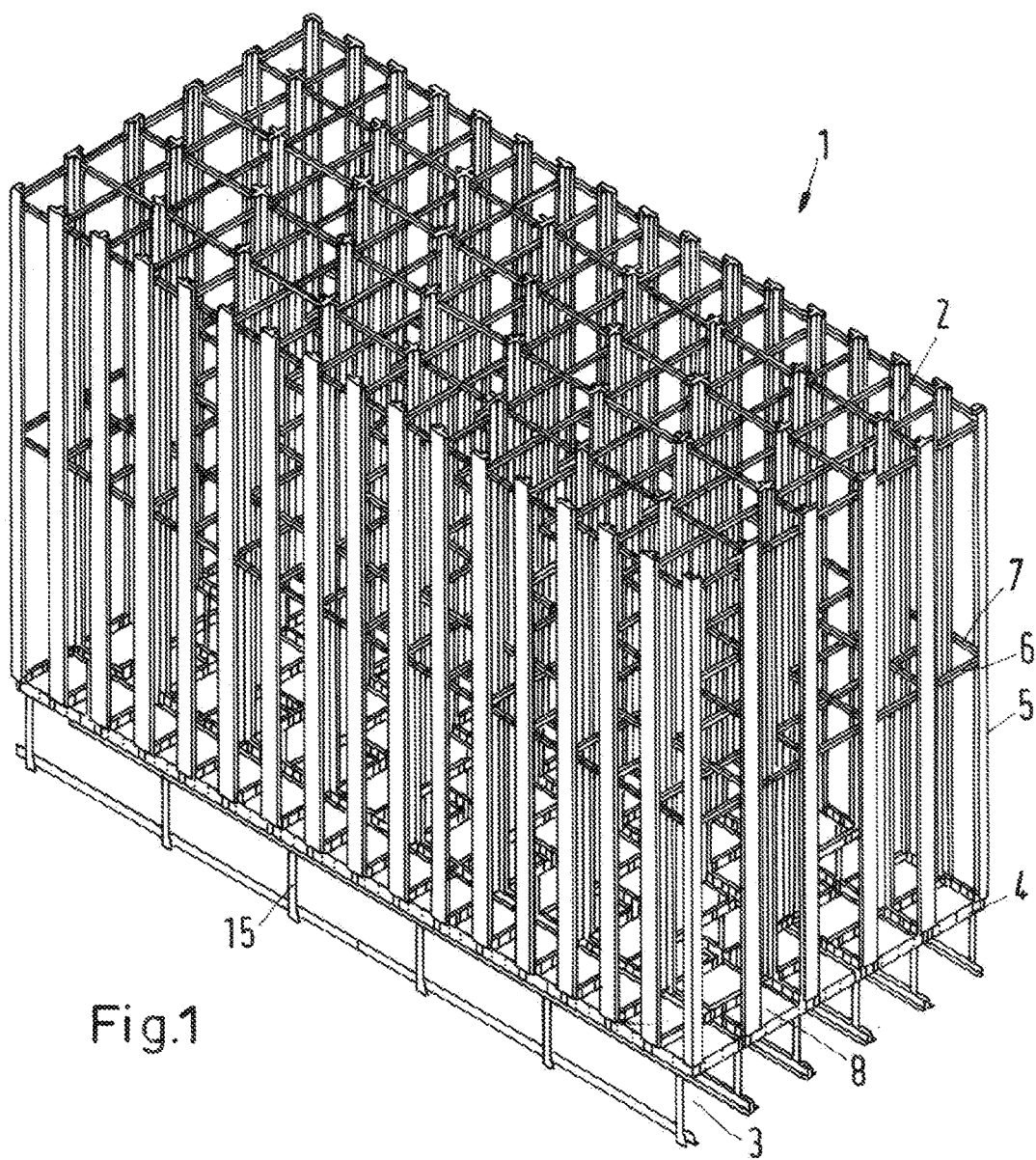
FIG. 1 shows a schematic illustration of a stacking storage arrangement.

FIG. 1 schematically shows a stacking storage arrangement 1 having multiple container receiving spaces 2 and a loading region 3 that is arranged below the container receiving spaces 2.

Between the container receiving spaces 2 and the loading space 3, a frame arrangement 4 is arranged. On the frame arrangement 4, uprights 5 are arranged which are connected to one another by transverse braces 6 and longitudinal braces 7.

For each loading space 3, the frame arrangement 4 comprises an opening 8 through which the container receiving space 2 is connected to the loading space 3.

Figure 2:
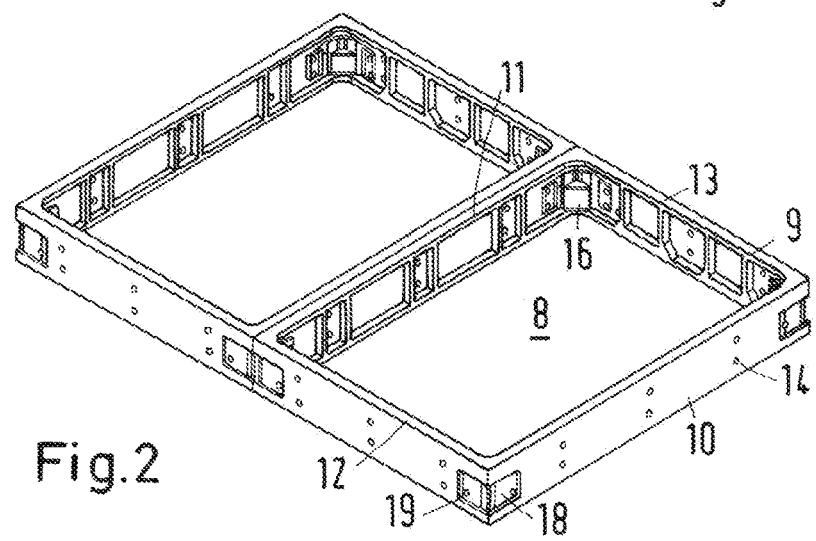
FIG. 2 shows a module of a frame arrangement.
Figure 3:
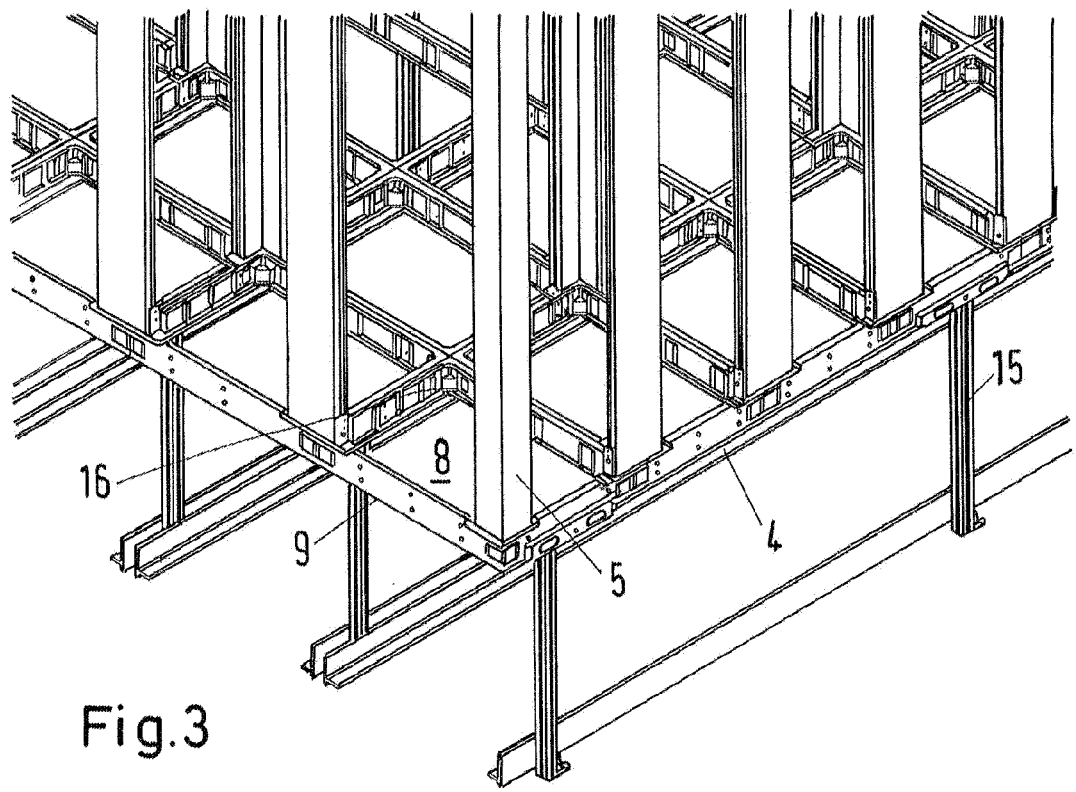
FIG. 3 shows an enlarged section of the stacking storage arrangement for the purpose of explaining the frame arrangement.
Figure 8:
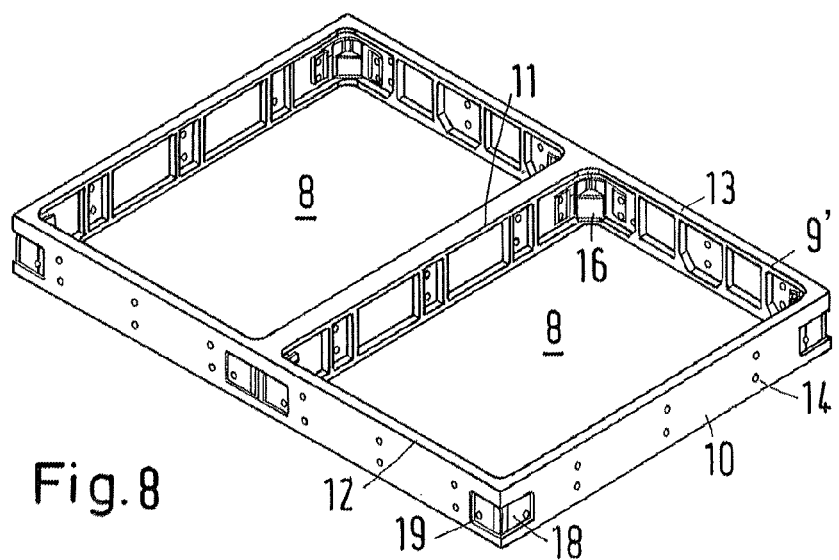
FIG. 8 shows a modified embodiment of the module illustrated in FIG. 2.

The frame arrangement 4 is composed of modules 9 that are schematically illustrated in FIG. 2. The modules 9 are embodied as cast parts, for example of iron or steel. In the present case, each module 9 comprises an opening 8. However, as illustrated in FIG. 8, it is also possible to use modules 9' that comprise more than one opening 8, for example 2, 3, 4, or 5 openings. The openings are thereby preferably arranged consecutively in a row. However, they can also be arranged in the form of a matrix, for example, with two or more rows and two or more columns. The size primarily depends on the options for transporting the modules 9 to the installation site.

Each module 9 is preferably embodied to be rectangular with two longitudinal sides 10, 11 and two transverse sides 12, 13. Both the longitudinal sides 10, 11 and also the transverse sides 12, 13 can be used to connect the module 9 to adjacent modules. For this purpose, prefabricated through-holes 14 can be provided, for example, through which the threaded bolts or other fasteners can be guided in order to connect adjacent modules 9 to one another. As a result, a frame arrangement 4 with a high mechanical stability can be produced without the transport of this frame arrangement 4 to the site of the stacking storage arrangement causing larger problems.

The frame arrangement 4 is mounted on the flooring or another contact surface via supports 15. With the aid of the supports 15, the frame arrangement 4 can be leveled, that is, aligned in a horizontal position.

Each opening 8 has four corners. In each corner, a holding latch 16 is arranged that is described in greater detail in connection with FIGS. 4 through 6. The holding latch 16 is arranged on a bracket 17 of a holding latch module 18. The holding latch module 18 is mounted in a recess 19. The recess 19 is embodied such that it extends through the module 9, that is, it forms an opening in the module 9.

The bracket 17 comprises two sections 20a, 20b that are arranged at a right angle to one another, that is, roughly 90°. The holding latch 16 can be pivoted about a pivot axis that is engaged with both sections 20a, 20b and so forms an angle of less than 90° with two adjacent sides of the opening 8. In the present case, the pivot axis forms an angle of roughly 45° with the adjacent sides of the opening 8.

Figure 4:
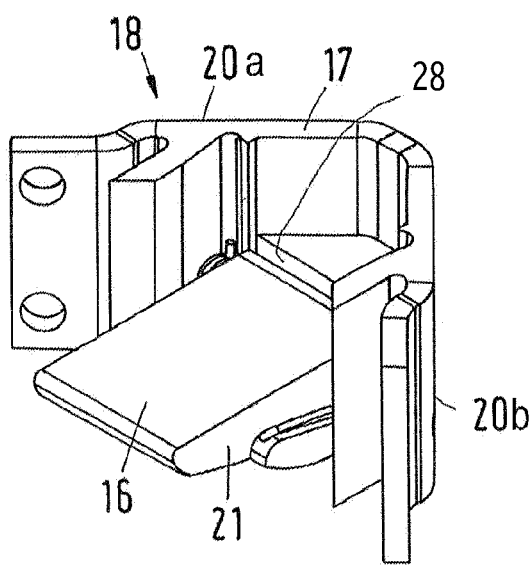
FIG. 4 shows a holding latch module in a holding position.
Figure 5:
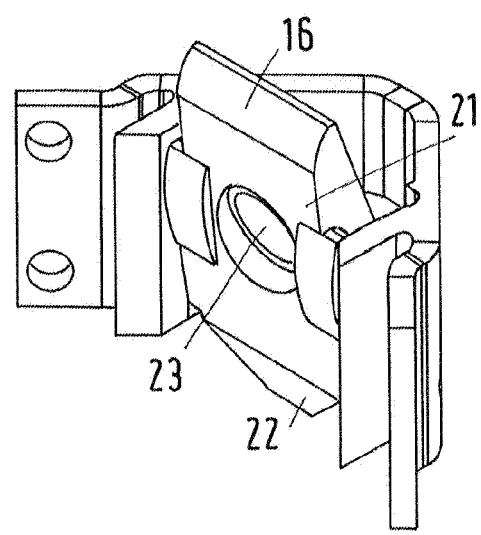
FIG. 5 shows the holding latch module in a release position.

The holding latch 16 is embodied as a two-armed lever having an inner arm 21 and an outer arm 22, wherein a stop 28 for the outer arm 22 is provided which the arm 22 strikes when the holding lever 16 is located in the holding position illustrated in FIG. 4.

On the bottom side of the inner arm 21 of the holding latch 16, a sensing element 23 of a sensor arrangement otherwise not illustrated in greater detail is arranged. The sensing element 23 is embodied as a reflector in the present case. A reflector of this type can be part of an optical sensor arrangement. An optical sensor arrangement of this type emits a beam of light in the direction of the sensing element 23 and has a receiver in order to receive a reflected beam of light. If the holding latch 16 is in the holding position illustrated in FIG. 4, then the sensing element 23 reflects the beam of light to the receiver. In this case, the receiver can determine the presence of the light beam and transmit this to a controller not illustrated in greater detail, which controller controls a lifting and a lowering of a container stack in a container receiving space. If the holding latch 16 is not located in the desired holding position when the container stack is in a certain position, and therefore cannot hold the container stack during the lowering, for example, then the sensor arrangement can generate an error signal. This error signal can then be analyzed by the control device such that the further lowering of the container stack is interrupted and an error message or malfunction message is outputted.

The sensor arrangement can be, but does not need to be, arranged on the stacking storage arrangement. It can, for example, also be arranged on a loading vehicle with which a container is driven into the stacking storage arrangement or with which a container is removed from the stacking storage arrangement.

Figure 6:
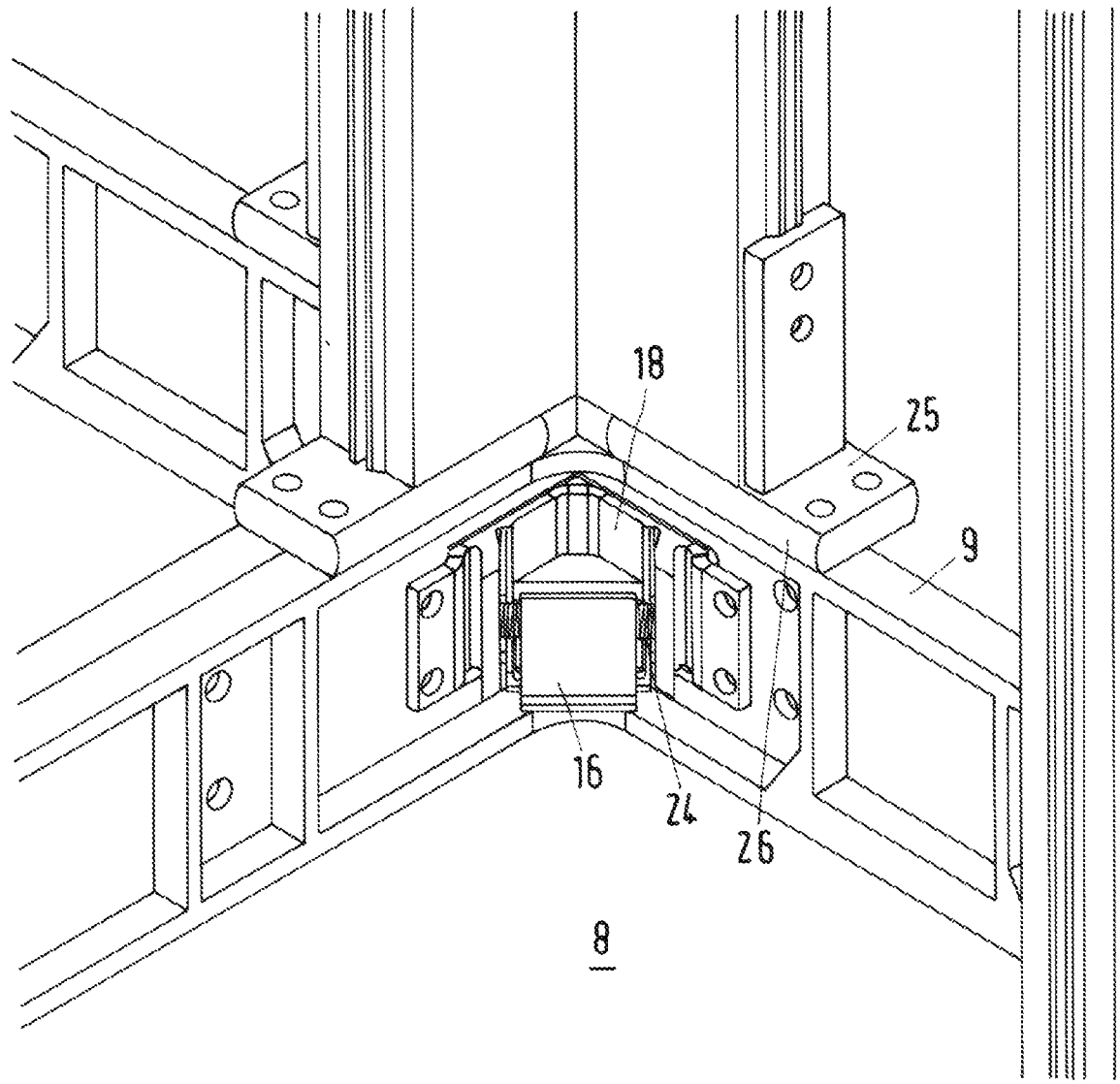
FIG. 6 shows the holding latch module in a corner of an opening of the frame arrangement.

FIG. 6 shows the holding latch 16, in the holding latch module 18 thereof, installed in the module 9. A spring 24 is provided which applies a force to the outer arm of the holding latch 16 in the direction of the aforementioned stop 28. The spring 24 (multiple springs can also be provided) thus ensures that the holding latch 16 is located in the holding position illustrated in FIG. 4 when no other forces are acting on the holding latch 16. Additionally, the center of gravity of the holding latch 16 can be arranged such that the holding latch pivots into the holding position through the effect of gravity.

The module 9 is provided with an insertion aid 25 on the top side thereof. In the present case, the insertion aid 25 is located in the region of the corners of the opening 8. However, multiple insertion aids 25 can also be arranged such that they are distributed across the perimeter of the opening 8. The insertion aid 25 is then not embodied to be angled, but rather straight. The insertion aid 25 comprises a rounded side 26 that projects slightly inwards into the opening 8. With the insertion aid 25, the risk of a container that is being lowered in the opening 8 becoming caught on the frame or on the edge of the opening 8 is minimized. The container is pushed away from the edge of the opening 8 by the rounded side 26. The insertion aid 25 can be embodied as a separate part that is attached to the module 9, or it can be embodied in one piece with the module 9.

Because an insertion aid 25 of this type can be present at each corner, it is thus possible to center the container that is being moved through the opening 8 from all sides in the direction of the middle of the opening 8.

Figure 7:
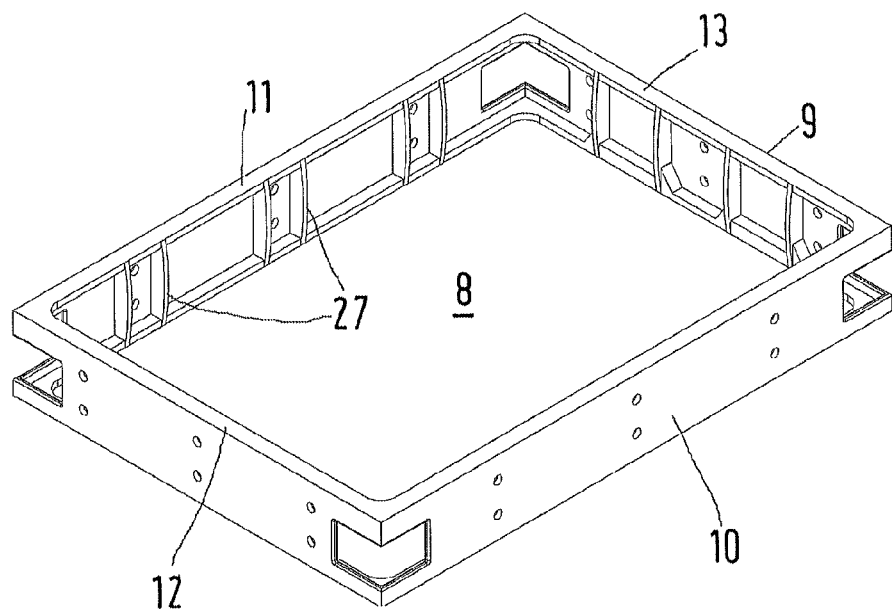
FIG. 7 shows a modified embodiment of a module.

FIG. 7 shows a slightly modified embodiment in which an inner wall of the opening 8 is curved inwards into the opening. The opening 8 is then, on the top side and on the bottom side thereof, slightly larger than in the middle between the top side and bottom side. The risk of a container becoming caught on the module 9 during the passage through the opening 8 is also reduced in this manner. The entire inner wall of the opening 8 thereby does not necessarily need to be curved inwards. It is sufficient if ribs 27 are provided on the inner wall of the opening 8, which ribs 27 form the corresponding curvature. Apart from this, the elements in FIG. 7 are labeled with the same reference numerals as in the other figures.

For the placement of a container, which is not illustrated in greater detail, into storage, a loading vehicle, likewise not illustrated in greater detail, is driven into the loading region until the container is located below the opening 8 of the frame arrangement 4. The container is then lifted by the loading vehicle until it reaches the bottommost container of a container stack already located in the container receiving space, and then lifts the container stack as a whole along with it in a further movement. The holding latches 16 are thereby pivoted out of the holding position illustrated in FIG. 4 into the release position illustrated in FIG. 5. Once the container being placed into storage has passed the holding latch 16, the holding latch 16 pivots back into its holding position (FIG. 4), and the container stack can then be lowered onto the holding latches 16. However, if the sensor arrangement with the sensing element 23 indicates that the holding position of the holding latch 16 has not been reached, then this lowering operation is interrupted.

For the removal of a container from the stacking storage arrangement, the bottommost container of the stack, and the entire stack of containers along with it, is lifted. The holding latch 16 is pivoted into the release position illustrated in FIG. 5, and the stack can be lowered. Once the container being removed has passed the holding latch 16, the holding latch 16 is pivoted back into its holding position (FIG. 4) and then holds the stack on the previously second-to-last container.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

The invention claimed is:

1. A stacking storage arrangement comprising:
multiple container receiving spaces;
a loading space located below the container receiving spaces; and
a frame arrangement arranged between the container receiving spaces and the loading space,
wherein the frame arrangement comprises multiple modules that are connected to one another, and
wherein each of the multiple modules includes longitudinal sides and transversal sides that form a closed rectangular shaped structure with at least one opening formed between these sides, through which the container receiving space is loadable.

2. The stacking storage arrangement according to claim 1, wherein at least one module defines multiple openings.

3. The stacking storage arrangement according to claim 2, wherein the multiple openings are arranged so that respective multiple container receiving spaces are loadable through the multiple openings.

4. The stacking storage arrangement according to claim 1, wherein at least one of the multiple modules is embodied as a cast part.

5. The stacking storage arrangement according to claim 1, wherein an inner wall delimiting the opening is curved into the opening.

6. The stacking storage arrangement according to claim 1, wherein, on a top side of at least one of the multiple modules, an insertion aid is arranged in a region of at least one edge of the opening.

7. The stacking storage arrangement according to claim 6, wherein the insertion aid projects inwards into the opening.

8. The stacking storage arrangement according to claim 7, wherein the insertion aid projecting inwards into the opening is rounded.

9. The stacking storage arrangement according to claim 1, further comprising holding latches, wherein the opening through which the container receiving space is loadable comprises corners in which the holding latches are respectively arranged.

10. The stacking storage arrangement according to claim 9, wherein each holding latch is arranged on a bracket of a holding latch module, the bracket being mounted in the frame arrangement.

11. The stacking storage arrangement according to claim 10, wherein the bracket is arranged in a notch in the frame arrangement.

12. The stacking storage arrangement according to claim 9, wherein the holding latch is pivotable about a pivot axis that forms an angle of less than 90° with two adjacent sides of the opening.

13. The stacking storage arrangement according to claim 9, wherein the holding latches are embodied as two-armed levers having an inner arm and an outer arm, wherein a stop is located for the outer arm.

14. The stacking storage arrangement according to claim 13, further comprising at least one spring arranged to apply a force to the outer arm in a direction of the stop.

15. The stacking storage arrangement according to claim 9, wherein a sensing element of a sensor arrangement is arranged on each holding latch.

16. The stacking storage arrangement according to claim 15, wherein the sensing element is arranged on a bottom side of the inner arm.

17. The stacking storage arrangement according to claim 15, wherein the sensing element comprises a reflector.

18. The stacking storage arrangement according to claim 1, wherein the multiple modules that are connected to one another on parallel side surfaces.

19. The stacking storage arrangement according to claim 1, wherein at least one lateral side of each of the multiple modules is directly connected to a lateral side of a longitudinally adjacent module and at least one longitudinal side of each of the multiple modules is directly connected to a longitudinal side of a laterally adjacent module.

20. A stacking storage arrangement comprising:
multiple container receiving spaces;
a loading space located below the container receiving spaces; and
a frame arrangement arranged between the container receiving spaces and the loading space,
wherein the frame arrangement provides an opening for each container receiving space through which a respective container receiving space is loadable or unloadable,
wherein the frame arrangement is formed from multiple modules that are connected to one another, where the multiple modules are closed structures having longitudinal sides and transversal sides defining at least one of the openings provided in the frame arrangement, and
wherein at least one of the multiple modules defines plural openings in the frame arrangement.

21. The stacking storage arrangement according to claim 20, wherein each of the plural openings are arranged so that respective container receiving spaces are loadable or unloadable.

22. The stacking storage arrangement according to claim 20, wherein at least one lateral side of each of the multiple modules is directly connected to a lateral side of a longitudinally adjacent module and at least one longitudinal side of each of the multiple modules is directly connected to a longitudinal side of a laterally adjacent module.

* * * * *